United States Patent
Lim et al.

(10) Patent No.: US 7,094,818 B2
(45) Date of Patent: Aug. 22, 2006

(54) THERMOPLASTIC RESIN COMPOSITIONS CONTAINING MIXTURES OF CYCLIC PHOSPHAZENES AND PHOSPHORIC ACID ESTERS

(75) Inventors: Jong Cheol Lim, Gyeonggi-Do (KR); Sang Hyun Hong, Gyeonggi-Do (KR); Kyung Hoon Seo, Seoul (KR); Sam Joo Yang, Gyeonggi-Do (KR)

(73) Assignee: Cheil Industries, Inc., Kyungsangbuk-do (KR)

( * ) Notice: Subject to any disclaimer, the term of this patent is extended or adjusted under 35 U.S.C. 154(b) by 0 days.

(21) Appl. No.: 10/488,449

(22) PCT Filed: Nov. 7, 2001

(86) PCT No.: PCT/KR01/01890

§ 371 (c)(1),
(2), (4) Date: Mar. 3, 2004

(87) PCT Pub. No.: WO03/020827

PCT Pub. Date: Mar. 13, 2003

(65) Prior Publication Data

US 2004/0249070 A1     Dec. 9, 2004

(30) Foreign Application Priority Data

Sep. 3, 2001   (KR) .............................. 2001/53894

(51) Int. Cl.
*C08L 69/00*   (2006.01)
*C08K 5/5399*  (2006.01)

(52) U.S. Cl. .............................. 524/97; 524/95; 524/96

(58) Field of Classification Search .................. 524/95, 524/96, 97
See application file for complete search history.

(56) References Cited

U.S. PATENT DOCUMENTS

| | | | |
|---|---|---|---|
| 3,839,513 A * | 10/1974 | Patel | 558/80 |
| 4,117,041 A * | 9/1978 | Guschl | 558/76 |
| 4,692,488 A | 9/1987 | Kress et al. | 524/139 |
| 5,061,745 A | 10/1991 | Witmann et al. | 524/139 |
| 5,204,394 A | 4/1993 | Gosens et al. | 524/125 |
| 5,672,645 A | 9/1997 | Eckel et al. | 524/127 |
| 6,437,029 B1 | 8/2002 | Lim et al. | 524/97 |
| 6,576,161 B1 | 6/2003 | Lim et al. | 252/609 |
| 6,630,524 B1 | 10/2003 | Lim et al. | 524/100 |
| 6,716,900 B1 | 4/2004 | Jang et al. | 524/125 |
| 2004/0249070 A1 * | 12/2004 | Lim et al. | 525/67 |

FOREIGN PATENT DOCUMENTS

| | | |
|---|---|---|
| EP | 0 728 811 A2 | 8/1996 |
| EP | 1 069 154 A1 | 1/2001 |
| JP | 59 202240 | 11/1984 |
| JP | 61 00785 | 1/1994 |
| KR | 2000 41992 | 1/2000 |
| KR | 2001 109044 | 12/2001 |
| KR | 2002 6350 | 1/2002 |
| WO | WO 99/19383 | 4/1999 |
| WO | WO 00/00544 | 1/2000 |
| WO | WO 00/09518 | 2/2002 |

OTHER PUBLICATIONS

Abstract of Japanese Patent Appl. Laid-open No. 59 202240, published Nov. 16, 1984.
Abstract of Japanese Patent Appl. Laid-open No. 61 00785, published Jan. 12, 1994.
Abstract of Korean Patent Appl. Laid-open No. 20002-41992, published Jan. 15, 2000.
Abstract of Korean Patent Appl. Laid-open No. 2001-109044, published Dec. 8, 2001.
Abstract of Korean Patent Appl. Laid-open No. 2002-6350, published Jan. 19, 2002.
Abstract of WO 99/19383, published Apr. 22, 1999.
Abstract of WO 00/09518, published Feb. 24, 2000.
Abstract of WO 00/00544, published Jan. 6, 2000.

* cited by examiner

*Primary Examiner*—David J. Buttner
(74) *Attorney, Agent, or Firm*—Maria Parrish Tungol

(57) ABSTRACT

The present invention relates to a flame retardant polycarbonate thermoplastic resin composition that comprises a polycarbonate resin, a rubber modified vinyl-grafted copolymer, a phosphorous mixture of a cyclic phosphazene oligomer compound and a phosphoric acid ester as a flame retardant, and a fluorinated polyolefin resin.

11 Claims, No Drawings

US 7,094,818 B2

THERMOPLASTIC RESIN COMPOSITIONS CONTAINING MIXTURES OF CYCLIC PHOSPHAZENES AND PHOSPHORIC ACID ESTERS

FIELD OF THE INVENTION

The present invention relates to a polycarbonate thermoplastic resin composition with good flame retardancy, heat resistance and mechanical properties. More particularly, the present invention relates to a flame retardant polycarbonate thermoplastic resin composition that comprises a polycarbonate resin, a rubber modified vinyl-grafted copolymer, a phosphorous compound mixture of a cyclic phosphazene oligomer compound and a phosphoric acid ester as a flame retardant, and a fluorinated polyolefin resin.

BACKGROUND OF THE INVENTION

A blend of a polycarbonate resin and a styrene-containing copolymer is a resin composition which has improved processability maintaining the good notched impact strength. The polycarbonate resin composition should further have good flame retardancy as well as high mechanical strength because the resin composition are applied to electric or electronic goods, automobile parts, office supplies, etc.

To provide the polycarbonate resin with good flame retardancy, a halogen-containing flame retardant and/or an antimony-containing compound were used. However, the disadvantages could be observed that the halogen-containing compound results in the corrosion of the mold itself by the hydrogen halide gases released during the molding process and is fatally harmful due to the toxic gases liberated in case of fire. Especially, since the polybromodiphenyl ether, mainly used for a halogen-containing flame retardant, can produce toxic gases such as dioxin or furan during combustion, flame retardants which are prepared without a halogen-containing compound have become a major concern in this field.

A general method is employ a phosphoric acid ester compound as a flame retardant to provide the polycarbonate resin with flame retardancy without using a halogen-containing compound. U.S. Pat. No. 4,692,488 discloses a thermoplastic resin composition comprising a halogen free aromatic polycarbonate resin, a halogen free SAN (styrene-acrylonitrile) copolymer, halogen free phosphorus compounds as flame retardants, a tetrafluoroethylene polymer and a small amount of ABS (acrylonitrile-butadiene-styrene) copolymer. If a halogen free phosphorus compound and a tetrafluoroethylene polymer are used together as in this U.S. patent, the dripping phenomenon can be prevented, but a juicing phenomenon occurs due to the migration of the flame retardant agent to the surface of the molded article during molding process.

U.S. Pat. No. 5,061,745 discloses a thermoplastic resin composition comprising an aromatic polycarbonate resin, an ABS graft copolymer, a copolymer, and a monophosphorous ester. As the flame retardant agent is monomeric, the juicing phenomenon is not prevented and the heat resistance is rapidly deteriorated.

It is known that an oligomeric phosphate is used as a flame retardant. Japanese Patent Publication No. 59-202,240 discloses a method of preparing an oligomeric phosphate and the use of the oligomeric phosphate in a polyamide or polycarbonate resin composition.

U.S. Pat. No. 5,204,394 discloses a resin composition comprising an aromatic polycarbonate resin, a styrene-containing copolymer or a graft copolymer, and oligomeric phosphate as flame retardants. Although the resin composition improves the juicing phenomenon and heat resistance, but is inferior to the resin composition using the monophosphorous esters as flame retardants in flame retardancy. Accordingly, to maintain a good flame retardancy, the resin composition should contain more flame retardants than in the resin composition containing monophosphorous ester as flame retardants. As a result, the resin composition shows poor mechanical properties due to the high content of a flame retardant. Furthermore, the resin composition contains still some monophosphorous ester which migrates to the surface of the molded article to cause juicing phenomenon in part.

U.S. Pat. No. 5,672,645 discloses a PC/ABS resin composition comprising an aromatic polycarbonate resin, a vinyl copolymer, a graft copolymer, a mixture of a monophosphate and an oligomeric phosphate, and a fluorinated polyolefin. In this case, the resin composition shows juicing phenomenon in which monophosphorous ester migrates to the surface of the molded article, and deterioration of heat resistance. And, as the flame retardability of an oligomeric phosphate ester is less than that of a momophosphorous ester in usual, the more oligomeric phosphate ester is contained in the flame retardant agent, the poorer flame retardancy of resin composition is.

Japanese Patent Laid-open No. 6-100,785 discloses a flame retardant resin composition which comprises a thermoplastic resin, a phosphate compound, and a silicon resin or a polyphosphazene to prevent from dripping of the resin during combustion. However, the Japanese patent application does not disclose that the flame retardancy of the resin composition had been improved.

EP 0 728 811 A2 discloses a thermoplastic resin composition comprising an aromatic polycarbonate, a graft copolymer, a copolymer and a phosphazene. The European patent teaches that no dripping occurs during combustion by using a phosphazene as a flame retardant even though an additional anti-dripping agent is not employed, and that the resin composition has excellent heat resistance and impact strength. However, the resin composition of the European patent has a poor processability due to the poor flowability by using the phosphazene, and causes black stripes and/or black lines on the surface of the molded article due to degradation of the resin or flame retardants when an excess stress is applied to the article during molding. In the European patent using phosphazene as a flame retardant, mechanical strength such as flexural strength and flexural modulus becomes deteriorated, and more amount of flame retardants should be used to maintain a certain degree of flame retardancy.

WO 00/09518 and WO 99/19383 disclose methods of preparing a cross-linked linear or cyclic phenoxy phosphazene and a thermoplastic resin composition using such phosphazene compounds. According to the patent applications, the cross-linked phenoxy phosphazene does not deteriorate the mechanical properties of the resin composition when applied, because the phosphazene has a high melting point and lower volatility. However, the resin composition of the patent applications has a poor processability due to the poor flowability by using the phosphazene, and causes black stripes and/or black lines on the surface of the molded article due to degradation of the resin or flame retardants when an excess stress is applied to the article during molding. In the patent applications using phosphazene as a flame retardant, mechanical strength such as flexural strength and flexural modulus becomes deteriorated.

The present inventors have developed a flame retardant thermoplastic resin composition that comprises a polycarbonate resin, a rubber modified vinyl-grafted copolymer, a vinyl copolymer, an oligomer type cyclic phosphazene compound and a phosphoric acid ester as a flame retardant and a fluorinated polyolefin resin, which has a good balance of physical properties such as impact strength, heat resistance, heat stability, processability and appearance.

OBJECTS OF THE INVENTION

A feature of the present invention is the provision of an excellent flame retardant thermoplastic resin composition.

Another feature of the present invention is the provision of a flame retardant thermoplastic resin composition with good heat resistance.

A further feature of the present invention is the provision of a flame retardant thermoplastic resin composition with good mechanical properties.

A further feature of the present invention is the provision of a flame retardant thermoplastic resin composition with a good balance of physical properties such as impact strength, heat stability, processability and appearance.

Other objects and advantages of this invention will be apparent from the ensuing disclosure and appended claims.

SUMMARY OF THE INVENTION

A flame retardant thermoplastic resin composition according to the present invention comprises (A) about 45 to 95 parts by weight of a polycarbonate resin, (B) about 1 to 50 parts by weight of a rubber modified vinyl-grafted copolymer prepared by graft-polymerizing ($b_1$) about 5 to 95 parts by weight of a monomer mixture of about 50 to 95% by weight of styrene, α-methylstyrene, halogen- or alkyl-substituted styrene, $C_{1-8}$ methacrylic acid alkyl ester, $C_{1-8}$ acrylic acid alkyl ester, or a mixture thereof and about 5 to 50% by weight of acrylonitrile, methacrylonitrile, $C_{1-8}$ methacrylic acid alkyl ester, $C_{1-8}$ acrylic acid alkyl ester, maleic acid anhydride, $C_{1-4}$ alkyl- or phenyl N-substituted maleimide or a mixture thereof onto ($b_2$) about 5 to 95 parts by weight of a rubber polymer wherein the rubber polymer is butadiene rubber, acryl rubber, ethylene-propylene rubber, styrene-butadiene rubber, acrylonitrile-butadiene rubber, isoprene rubber, copolymer of ethylene-propylene-diene (EPDM), polyorganosiloxane-polyalkyl (meth)acrylate rubber or a mixture thereof, (C) about 0 to 50 parts by weight of a vinyl copolymer polymerized with ($c_1$) about 50 to 95% by weight of styrene, α-methylstyrene, halogen- or alkyl-substituted styrene, $C_{1-8}$ methacrylic acid alkyl ester, $C_{1-8}$ acrylic acid alkyl ester, or a mixture thereof and ($c_2$) about 5 to 50% by weight of acrylonitrile, methacrylonitrile, $C_{1-8}$ methacrylic acid alkyl ester, $C_{1-8}$ acrylic acid alkyl ester, maleic acid anhydride, $C_{1-4}$ alkyl- or phenyl N-substituted maleimide or a mixture thereof, (D) about 1 to 30 parts by weight of a phosphorous mixture of ($d_1$) about 1 to 50% by weight of a cyclic phosphazene oligomer compound and ($d_2$) about 99 to 50% by weight of a phosphoric acid ester, as a flame retardant, per 100 parts by weight of (A)+(B)+(C), and (E) about 0.05 to 5.0 parts by weight of a fluorinated polyolefin resin with average particle size of about 0.05 to 1000 μm and density of about 1.2 to 2.3 g/cm³, per 100 parts by weight of (A)+(B)+(C).

DETAILED DESCRIPTION OF THE INVENTION

A flame retardant thermoplastic resin composition according to the present invention comprises (A) about 45 to 95 parts by weight of a polycarbonate resin, (B) about 1 to 50 parts by weight of a rubber modified vinyl-grafted copolymer, (C) about 0 to 50 parts by weight of a vinyl copolymer, (D) about 1 to 30 parts by weight of a phosphorous mixture of a cyclic phosphazene oligomer compound and a phosphoric acid ester, as a flame retardant, per 100 parts by weight of (A)+(B)+(C), and (E) about 0.05 to 5.0 parts by weight of a fluorinated polyolefin resin per 100 parts by weight of (A)+(B)+(C).

Each component will be described in detail as follow:

(A) Polycarbonate Resin

The polycarbonate resin is prepared by reacting a diphenol represented by the following formula (I) with a phosgene, a halogen formate or a carboxylic acid diester:

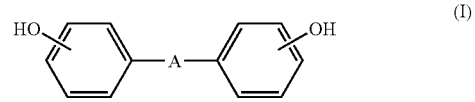

where A is a single bond, a $C_{1-5}$ alkylene group, a $C_{1-5}$ alkylidene group, a $C_{5-6}$ cycloalkylidene group, S or $SO_2$.

The examples of the diphenol include hydroquinone, resorcinol, 4,4'-dihydroxydiphenol, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, and 2,2-bis-(3,5-dichloro-4-hydroxyphenyl)-propane. More preferable diphenols are 2,2-bis-(4-hydroxyphenyl)-propane, 2,2-bis-(3,5-dichloro-4-hydroxyphenyl)-propane, and 1,1-bis-(4-hydroxyphenyl)-cyclohexane, and the most preferable diphenol is 2,2-bis-(4-hydroxyphenyl)-propane called 'bisphenol A'.

In the present invention it is preferable that the polycarbonate resin (A) has a weight average molecular weight ($M_w$) of about 10,000 to 200,000, more preferably about 15,000 to 80,000.

A polycarbonate with branched chains may also be preferably used. In particular a compound with 3 valences or above may be added in an amount of about 0.05 to 2 mol % per the total moles of the diphenol to be used. A homopolymer of polycarbonate, a copolymer of polycarbonate or a mixture thereof may be used in this invention. Some portion of the polycarbonate resin may be replaced with an aromatic polyester-carbonate resin that is obtained by polymerization in the presence of an ester precursor, such as difunctional carboxylic acid. The polycarbonate resin is used in an amount of about 45 to 95 parts by weight as per 100 parts by weight of the flame retardant thermoplastic resin composition according to the present invention.

(B) Rubber Modified Vinyl-Grafted Copolymer

The rubber modified vinyl-grafted copolymer according to the present invention is prepared by graft-polymerizing ($b_1$) about 5 to 95 parts by weight of a monomer mixture of about 50 to 95% by weight of styrene, α-methylstyrene, halogen- or alkyl-substituted styrene, $C_{1-8}$ methacrylic acid alkyl ester, $C_{1-8}$ acrylic acid alkyl ester, or a mixture thereof and about 5 to 50% by weight of acrylonitrile, methacrylonitrile, $C_8$ methacrylic acid alkyl ester, $C_{1-8}$ acrylic acid alkyl ester, maleic acid anhydride, $C_{1-4}$ alkyl- or phenyl N-substituted maleimide or a mixture thereof onto ($b_2$) about 5 to 95 parts by weight of a rubber polymer wherein the rubber polymer is butadiene rubber, acryl rubber, ethylene-propylene rubber, styrene-butadiene rubber, acrylonitrile-butadiene rubber, isoprene rubber, copolymer of ethylene-propylene-diene (FPDM), polyorganosiloxane-polyalkyl (meth)acrylate rubber or a mixture thereof.

The $C_{1-8}$ methacrylic acid alkyl ester is obtained from methacrylic acid and monohydric alcohol with 1 to 8 carbon atoms and the $C_{1-8}$ acrylic acid alkyl ester from acrylic acid and monohydric alcohol with 1 to 8 carbon atoms. The examples of the acid alkyl ester include methacrylic acid methyl ester, methacrylic acid ethyl ester, acrylic acid methyl ester, acrylic acid ethyl ester, and methacrylic acid propyl ester. Methacrylic acid methyl ester is the most preferable.

Preferable examples of the rubber modified vinyl-grafted copolymer are grafted-polymers obtained by graft polymerizing a mixture of styrene and acrylonitrile, and, optionally, (meth)acrylic acid alkyl ester onto butadiene rubber, acryl rubber or styrene-butadiene rubber, or by graft polymerizing (meth)acrylic acid alkyl ester onto butadiene rubber, acryl rubber or styrene-butadiene rubber. The most preferable examples of the rubber modified vinyl-grafted copolymer are a grafted-polymer that a mixture of styrene and acrylonitrile is grafted onto butadiene rubber, which is called acrylonitrile-butadiene-styrene (ABS) resin, and a grafted-polymer of MBS resin.

The rubber polymer to prepare the rubber modified vinyl-grafted copolymer has preferably an average particle size of about 0.05 to 4.0 μm considering the impact strength and appearance.

The rubber modified graft copolymer according to the present invention can be prepared through a conventional polymerization process such as emulsion, suspension, solution or bulk process. However, the copolymer can be preferably prepared through the emulsion or bulk process in which vinyl monomers are added to the rubber polymer using an initiator.

The rubber modified vinyl-grafted copolymer is used in an amount of about 1 to 50 parts by weight as per 100 parts by weight of the flame retardant thermoplastic resin composition according to the present invention.

(C) Vinyl Copolymer

The vinyl copolymer of the present invention is a copolymer that is polymerized with ($c_1$) about 50 to 95% by weight of styrene, α-methylstyrene, halogen- or alkyl-substituted styrene, $C_{1-8}$ methacrylic acid alkyl ester, $C_{1-8}$ acrylic acid alkyl ester, or a mixture thereof and ($c_2$) about 5 to 50% by weight of acrylonitrile, methacrylonitrile, $C_{1-8}$ methacrylic acid alkyl ester, $C_{1-8}$ acrylic acid alkyl ester, maleic acid anhydride, $C_{1-4}$ alkyl- or phenyl N-substituted maleimide or a mixture thereof. A mixture of the copolymers may be used as the component (C).

The $C_{1-8}$ methacrylic acid alkyl ester is obtained from methacrylic acid and monohydric alcohol with 1 to 8 carbon atoms and the $C_{1-8}$ acrylic acid alkyl ester from acrylic acid and monohydric alcohol with 1 to 8 carbon atoms. The examples of the acid alkyl ester include methacrylic acid methyl ester, methacrylic acid ethyl ester, acrylic acid methyl ester, acrylic acid ethyl ester, and methacrylic acid propyl ester. Methacrylic acid methyl ester is the most preferable.

The vinyl copolymer can be produced as by-products when preparing the rubber modified vinyl-grafted copolymer (B). The by-products are mostly produced when an excess of monomers are grafted onto a small amount of rubber polymer or when a chain transfer agent is used in excess. The amount of the vinyl copolymer to be used in this invention does not include the amount of the by-products that might be produced during preparation of the rubber modified vinyl-grafted copolymer (B).

The preferable examples of the vinyl copolymer are a copolymer of styrene and acrylonitrile, a copolymer of α-methylstyrene and acrylonitrile, and a copolymer of styrene, α-methylstyrene and acrylonitrile. The vinyl copolymer is preferably prepared by emulsion, suspension, solution or bulk process, and has a weight average molecular weight ($M_w$) of about 15,000 to 200,000.

Another preferable examples of the vinyl copolymer (C) is a copolymer prepared from a mixture of methacrylic acid methyl ester monomers and optionally acrylic acid methyl ester monomers. The vinyl copolymer is preferably prepared by emulsion, suspension, solution or bulk process, and has a weight average molecular weight ($M_w$) of about 20,000 to 250,000.

A further preferable example of the vinyl copolymer is a copolymer of styrene and maleic acid anhydride, which is prepared by a continuous bulk process or a solution process. The maleic acid anhydride is preferably used in the amount of about 5 to 50% by weight. The copolymer of styrene and maleic acid anhydride has a weight average molecular weight ($M_w$) of about 20,000 to 200,000 and an intrinsic viscosity of about 0.3 to 0.9.

The styrene for preparation of the component (C) in this invention can be replaced with p-methylstyrene, vinyltoluene, 2,4-dimethylstyrene or α-methylstyrene.

The vinyl copolymer is used in an amount of about 0 to 50 parts by weight as per 100 parts by weight of the flame retardant thermoplastic resin composition according to the present invention.

(D) Phosphorous Mixture of Cyclic Phosphazene Oligomer and Phosphoric Acid Ester ($D_1$) Cyclic Phosphazene Oligomer The cyclic phosphazene oligomer according to the present invention is an oligomer type compound or their mixture of the cyclic phosphazene linked with a linking group having a $R_2$ group, which is represented as following Formula (II):

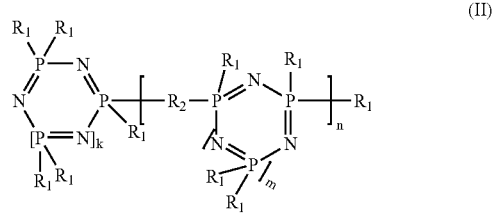

where $R_1$ is alkyl, aryl, alkyl substituted aryl, aralkyl, alkoxy, aryloxy, amino or hydroxyl, k and m are an integer from 1 to 10, $R_2$ is dioxyarylene group of $C_{6-30}$ or a derivative thereof, and n is 0 or an integer representing the number of repeating unit and the average value of n in the mixture of the compound is 0.3 to 3. The alkoxy and aryloxy groups may be substituted with alkyl, aryl, amino, hydroxyl etc.

In Formula (II), when cyclic phosphazenes of n+1 monomers are linked, the oligomer of cyclic phosphazene is obtained, which has a number average degree of polymerization of n.

It is preferable that the mixture of cyclic phosphazene oligomer has a number average degree of polymerization (n) of 0.3 to 3. In the present invention, cyclic phosphazene oligomers having n value of 0 to 10 may be preferably used in single or in combination as a mixture. The cyclic phosphazene oligomers may be mixed before or after polymerization. The cyclic phosphazene oligomers may have a branched chain.

In Formula (II), the more preferable groups of $R_1$ are alkoxy and aryloxy, and the most preferable groups of $R_1$ is phenoxy.

The preferable group of $R_2$ is a derivative from catechol, resorcinol, hydroquinone, or the bisphenylenediol of the following Formula (III):

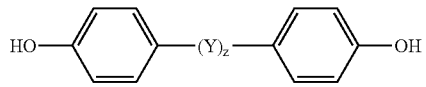

where Y is alkylene of $C_{1-5}$, alkylidene of $C_{1-5}$, cycloalkylidene of $C_{5-6}$, S or $SO_2$, and z is 0 or 1.

The cyclic phosphazene oligomer of the present invention can be prepared through a conventional method which is not limited. The following method for preparation can be appropriately adopted.

Allyl alcohol or aryl alcohol reacts with alkali metal hydroxide such as sodium hydroxide and lithium hydroxide to prepare alkali metal alkylate or alkali metal arylate. In the same manner, diol with $R_2$ group reacts with alkali metal hydroxide to prepare alkali metal diarylate. Cyclic dichlorophophazene reacts with a mixture of the alkali metal alkylate or alkali metal arylate and the alkali metal diarylate, and the resulting solution reacts further with the alkali metal alkylate or alkali metal arylate to obtain the cyclic phosphazene oligomer according to the present invention.

($D_2$) Phosphoric Acid Ester

The phosphoric acid ester is represented by the following Formula (IV). The phosphoric acid ester may be used in single or in combination as a mixture.

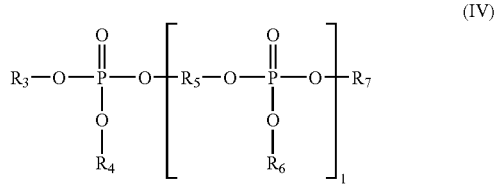

where $R_3$, $R_4$, $R_5$ and $R_7$ are a $C_{6-20}$ aryl group or an alkyl-substituted $C_{6-20}$ aryl group, respectively, preferably a phenyl group or an alkyl-substituted phenyl group in which alkyl is methyl, ethyl, isopropyl, t-butyl, isobutyl, isoamyl or t-amyl, preferably methyl, ethyl, isopropyl or t-butyl; $R_5$ is a $C_{6-30}$ arylene group or an alkyl-substituted $C_{6-30}$ arylene group, preferably resorcinol, hydroquinone or bisphenol-A; and l means the number of repeating units and the average value of l in the phosphate mixture is 0 to 3.

In the present invention, it is preferable to use an oligomer type phosphoric acid ester that is a derived from a $C_{6-30}$ arylene group and has an average value of l of about 0 to 3. The oligomer type phosphoric acid ester is a mixture of oligomers in which l is 0, 1, 2 and 3, respectively. The oligomer type phosphoric acid esters are mixed before or after polymerization.

The representative examples of the phosphoric acid ester with l=0 are tri(alkylphenyl)phosphate, di(alkylphenyl) monophenylphosphate, diphenylmono(alkylphenyl)phosphate and triphenylphosphate. The phosphoric acid ester can be used in single or in combination as a mixture.

About 1 to 30 parts by weight of a phosphorous mixture of ($d_1$) about 1 to 50% by weight of a cyclic phosphazene oligomer compound and ($d_2$) about 99 to 50% by weight of a phosphoric acid ester, as a flame retardant, per 100 parts by weight of (A)+(B)+(C).

(E) Fluorinated Polyolefin Resin

The fluorinated polyolefin resin (E) according to the present invention is prepared by a conventional process, for example, the resin is prepared in an aqueous solvent at 7~71 kg/cm² and 0~200° C., preferably 20~100° C., in the presence of a free radical forming catalyst such as sodium-, potassium-, or ammonium-peroxydisulphate.

The examples of the fluorinated polyolefin resin are polytetrafluoroethylene, polyvinylidenefluoride, tetrafluoroethylene/vinylidenefluoride copolymer, tetrafluoroethylene/hexafluoropropylene copolymer, and ethylene/tetrafluoroethylene copolymer. The fluorinated polyolefin resin may be used in single or in combination as a mixture. The fluorinated polyolefin resin has preferably average particle size of about 0.05 to 1000 μm and density of about 1.2 to 2.3 g/cm³.

The fluorinated polyolefin resin functions to form a fibrillar network when the resin composition containing the fluorinated polyolefin resin is extruded, resulting to increase the flow viscosity and to increase the shrinkage during combustion so as to prevent the dripping phenomena.

The fluorinated polyolefin resin is used in emulsion state or in powder state. In case using in emulsion state, dispersion of the fluorinated polyolefin resin is good, but the process will be somewhat complicated. Accordingly, if the fluorinated polyolefin resin could be uniformly dispersed in the entire resin composition to form the fibrillar network structure, it is preferable to use the fluorinated polyolefin resin in powder state.

The fluorinated polyolefin resin is used in an amount of about 0.05 to 5.0 parts by weight as per 100 parts by weight of (A)+(B)+(C) of the flame retardant thermoplastic resin composition according to the present invention.

Other additives may be contained in the resin composition of the present invention. The additives include an additional flame retardant, a lubricant, a releasing agent, an anti-dripping agent, an impact modifier, a plasticizer, a heat stabilizer, an oxidation inhibitor, a light stabilizer, a compatibilizer and the like. An inorganic filler such as talc, silica, mica, glass fiber, an organic or inorganic pigment and/or dye can be added too. The additives are employed in an amount of about 0 to 60 parts by weight as per 100 parts by weight of (A)+(B)+(C) of the flame retardant thermoplastic resin composition, preferably about 1 to 40 parts by weight.

The flame retardant thermoplastic resin composition according to the present invention can be prepared by a conventional method. All the components and additives are mixed together and extruded through an extruder and are prepared in the form of pellets.

The flame retardant thermoplastic resin composition according to the present invention can be applied to electric or electronic goods, automobile parts, office supplies, etc which require good flame retardancy, weld-line strength and impact strength.

The invention may be better understood by reference to the following examples which are intended for the purpose of illustration and are not to be construed as in any way limiting the scope of the present invention, which is defined in the claims appended hereto. In the following examples, all parts and percentage are by weight unless otherwise indicated.

EXAMPLES

The components to prepare flameproof thermoplastic resin compositions in Examples 1~6 and Comparative Examples 1~7 are as follows:

(A) Polycarbonate Resin

Bisphenol-A with a weight average molecular weight ($M_w$) of about 25,000 was used as polycarbonate resin.

(B) Rubber Modified Vinyl-Grafted Copolymer ($B_1$) 50 parts of butadiene rubber latex, 36 parts of styrene, 14 parts of acrylonitrile and 150 parts of deionized water were mixed. To the mixture, 1.0 parts of potassium oleate, 0.4 parts of cumenhydroperoxide, and 0.3 parts of t-dodecyl mercaptan chain transfer agent were added. The blend was kept at 75° C. for 5 hours to obtain ABS latex. To the ABS latex, 1% sulfuric acid was added, coagulated and dried to obtain styrene-containing graft copolymer resin (g-ABS) in powder form.

($B_2$) A graft copolymer of EXL-2602 (product name) by Kureha Co. was used, in which methacrylic acid ester monomers are grafted onto butadiene rubber.

(C) Vinyl Copolymer 71 parts of styrene, 29 parts of acrylonitrile, 120 parts of deionized water and 0.2 parts of azobisisobutylonitrile (AIBN) were blended. To the blend, 0.5 parts of tricalciumphosphate and 0.3 parts of mercaptan-containing chain transfer agent were added. The resultant solution was heated to 80° C. for 90 minutes and kept for 180 minutes. The resultant was washed, dehydrated and dried. Styrene-acrylonitrile copolymer (SAN) was obtained.

(D) Phosphorous Compound ($d_1$) Cyclic Phosphazene Oligomer

The cyclic phosphazene oligomer is a mixture of: 66.5% by weight of an oligomer of Formula (II) in which $R_1$ is phenoxy, k and m are 1 or 2, and n is 0; 20.3% by weight of an oligomer of Formula (II) in which $R_1$ is phenoxy, $R_2$ is a derivative from resorcinol, k and m are 1 or 2, and n is 1; 4.9% by weight of an oligomer of Formula (U) in which $R_1$ is phenoxy, $R_2$ is a derivative from resorcinol, k and m are 1 or 2, and n is 2; and 8.3% by weight of an oligomer of Formula (II) in which $R_1$ is phenoxy, $R_2$ is a derivative from resorcinol, k and m are 1 or 2, and n is 3 or more.

($d_2$) Phosphate Compound ($d_{2a}$) The bisphenol-A type phosphoric acid ester represented by the chemical Formula (IV) is used, where $R_3$, $R_4$, $R_6$ and $R_7$ are a phenyl group, which consists of 3.4% by weight of the compound of l=0, 85.4% by weight of the compound of l=1, and 11.1% by weight of the compound of l=2, and which has an average of l=1.0. The phosphoric acid ester is manufactured by Daihachi Co. of Japan as CR-741S (product name).

($d_{2b}$) Triphenylphosphate (TPP) of l=0 in the chemical Formula(IV) was used. The TPP is manufactured by Daihachi Co. of Japan.

($d_3$) Linear Cross-linked Phosphazene.

The phosphazene used in the Comparative Examples is a mixture of linear cross-linked phosphazene oligomers. The mixture was prepared to link 62% by weight of phenoxy phosphazene trimer, 12% by weight of phenoxy phosphazene tetramer, and 26% by weight of phenoxy phosphazene pentamer or more with hydroquinone. The molar ratio of phenoxy to hydroquinone is 1.7 to 0.15 and the weight average molecular weight is about 1100.

(E) Fluorinated Polyolefin Resin

Teflon (registered trademark) 7AJ by Dupont company was used.

Examples 1–6

The components as shown in Table 1, an antioxidant and a heat stabilizer were mixed in a conventional mixer and the mixture was extruded through a twin screw extruder with L/D=35 and Ø=45 mm at 240° C. to prepare in pellet form. The resin pellets were molded into test specimens for measuring flame retardancy and mechanical properties using a 10 oz injection molding machine at 240° C. The specimens were kept at the relative humidity of 50% at 23° C. for 48 hours. The physical properties were measured in accordance with ASTM regulations.

Comparative Examples 1–7

Comparative Example 1 was conducted in the same manner as in Example 1 except that the phosphorous mixture with different composition was used as in Table 1.

Comparative Examples 2–4 were conducted in the same manner as in Example 1 except that a single phosphorous compound was used as in Table 1.

Comparative Example 5 was conducted in the same manner as in Example 2 except that a linear phosphazene oligomer was used as in Table 1.

Comparative Example 6 was conducted in the same manner as in Example 6 except that a phosphorous acid ester compound only was used as in Table 1.

Comparative Example 7 was conducted in the same manner as in Example 6 except that a linear phosphazene oligomer was used as in Table 1.

TABLE 1

| | | Examples | | | | | | Comparative Examples | | | | | | |
|---|---|---|---|---|---|---|---|---|---|---|---|---|---|---|
| | | 1 | 2 | 3 | 4 | 5 | 6 | 1 | 2 | 3 | 4 | 5 | 6 | 7 |
| (A) | | 75 | 75 | 75 | 75 | 75 | 95 | 75 | 75 | 75 | 75 | 75 | 95 | 95 |
| (B) | ($B_1$) | 12 | 12 | 12 | 12 | 12 | — | 12 | 12 | 12 | 12 | 12 | — | — |
| | ($B_2$) | — | — | — | — | — | 5 | — | — | — | — | — | 5 | 5 |
| (C) | | 13 | 13 | 13 | 13 | 13 | — | 13 | 13 | 13 | 13 | 13 | — | — |
| (D) | ($d_1$) | 1 | 3 | 5 | 2 | 2 | 1 | 10 | 13 | — | — | — | — | — |

TABLE 1-continued

|  | Examples | | | | | | Comparative Examples | | | | | | |
| --- | --- | --- | --- | --- | --- | --- | --- | --- | --- | --- | --- | --- | --- |
|  | 1 | 2 | 3 | 4 | 5 | 6 | 1 | 2 | 3 | 4 | 5 | 6 | 7 |
| ($d_{2a}$) | 10 | 8 | 7 | 11 | — | 2 | 2 | — | 13 | — | 8 | 3 | 2 |
| ($d_{2b}$) | 2 | 2 | 1 | — | 11 | 1 | 1 | — | — | 13 | 2 | 1 | 1 |
| ($d_3$) | — | — | — | — | — | — | — | — | — | — | 3 | — | 1 |
| (E) | 0.5 | 0.5 | 0.5 | 0.5 | 0.5 | 0.4 | 0.5 | 0.5 | 0.5 | 0.5 | 0.5 | 0.4 | 0.4 |

The mechanical properties of the test specimens of Examples 1–6 and Comparative Examples 1–7 were measured as follow:

(1) Flame Retardancy

The flame retardancy was measured in accordance with UL94VB. The test specimens have a thickness of 1.6 mm.

(2) Total Flame Out Time

For each Example, five specimens were tested twice. The total flame out time is the sum of the first flame out time and the second flame out time.

(3) Flexural Strength

The flexural strength was measured in accordance with ASTM D790.

(4) Heat Distortion Temperature

The heat distortion temperature was measured in accordance with ASTM D648 under 18.6 kgf.

(5) Melt Flow Index

The melt flow index was measured in accordance with ASTM D1238 under 220° C./10 kgf.

The test results of Examples 1–6 and Comparative Examples 1–7 are shown in Table 2.

TABLE 2

|  | Examples | | | | | | Comparative Examples | | | | | | |
| --- | --- | --- | --- | --- | --- | --- | --- | --- | --- | --- | --- | --- | --- |
|  | 1 | 2 | 3 | 4 | 5 | 6 | 1 | 2 | 3 | 4 | 5 | 6 | 7 |
| UL94VB(1/16″) | V-0 | V-0 | V-0 | V-0 | V-0 | V-0 | V-1 | V-1 | V-2 | V-1 | V-1 | V-1 | V-1 |
| Total Flame Out Time (sec) | 18 | 20 | 21 | 22 | 12 | 13 | 68 | 75 | 124 | 55 | 67 | 66 | 64 |
| Flexural Strength | 835 | 850 | 845 | 840 | 845 | 910 | 820 | 805 | 820 | 825 | 830 | 895 | 900 |
| HDT | 85 | 85 | 88 | 90 | 84 | 120 | 91 | 95 | 86 | 80 | 84 | 119 | 120 |
| MFI | 39 | 36 | 34 | 34 | 40 | 20 | 30 | 25 | 37 | 42 | 36 | 22 | 21 |

As shown in Table 2, the resin compositions employing a phosphorous mixture of cyclic phosphazene oligomer and phosphorous acid ester show synergistic effect in flame retardancy and flexural strength with no big difference in heat distortion temperature and melt flow index, compared to those employing a single phosphorous compound. The resin composition using a linear phosphazene oligomer shows a poor flame retardancy.

The present invention can be easily carried out by an ordinary skilled person in the art. Many modifications and changes may be deemed to be with the scope of the present invention as defined in the following claims.

What is claimed is:

1. A flame retardant thermoplastic resin composition comprising:

(A) about 45 to 95 parts by weight of a polycarbonate resin;

(B) about 1 to 50 parts by weight of a rubber modified vinyl-grafted copolymer prepared by graft-polymerizing ($b_1$) about 5 to 95 parts by weight of a monomer mixture of about 50 to 95% by weight of at least one of styrene, α-methylstyrene, halogen-substituted styrene, alkyl-substituted styrene, $C_{1-8}$ methacrylic acid alkyl ester, $C_{1-8}$ acrylic acid alkyl ester, or a mixture thereof and about 5 to 50% by weight of acrylonitrile, methacrylonitrile, $C_{1-8}$ methacrylic acid alkyl ester, $C_{1-8}$ acrylic acid alkyl ester, maleic acid anhydride, or $C_{1-4}$ alkyl- or phenyl N-substituted malcimide onto ($b_2$) about 5 to 95 parts by weight of a rubber polymer wherein the rubber polymer is butadiene rubber, acryl rubber, ethylene-propylene rubber, styrene-butadiene rubber, acrylonitrile-butadiene rubber, isoprene rubber, copolymer of ethylene-propylene-diene (FPDM), polyorganosiloxane-polyalkyl (meth)acrylate rubber or a mixture thereof;

(C) about 0 to 50 parts by weight of a vinyl copolymer polymerized with ($c_1$) about 50 to 95% by weight of at least one of styrene, α-methylstyrene, halogen- or alkyl-substituted styrene, $C_{1-8}$ methacrylic acid alkyl ester, or $C_{1-8}$ acrylic acid alkyl ester and ($c_2$) about 5 to 50% by weight of at least one of acrylonitrile, methacrylonitrile, $C_{1-8}$ methacrylic acid alkyl ester, $C_{1-8}$ acrylic acid alkyl ester, maleic acid anhydride, and $C_{1-4}$ alkyl-maleimide or phenyl N-substituted maleimide;

(D) about 1 to 30 parts by weight of a phosphorous mixture, as a flame retardant, per 100 parts by weight of (A)+(B)+(C), of ($d_1$) about 1 to 50% by weight of a cyclic phosphazene represented by the following formula;

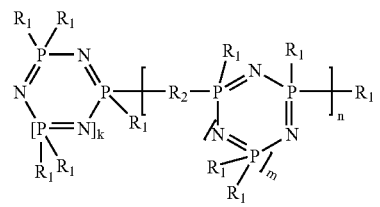

where $R_1$ is alkyl, aryl, alkyl substituted aryl, aralkyl, alkoxy, aryloxy, amino or hydroxyl, k and m are an integer from 1 to 10, $R_2$ is dioxyarylene group of $C_{6-30}$ or a derivative thereof, and n is 0 or an integer representing the number of repeating unit and the average value of n in the mixture of the phosphazene compound is 0.3 to 3; and ($d_2$) about 99 to 50% by weight of a phosphoric acid ester represented by the following formula;

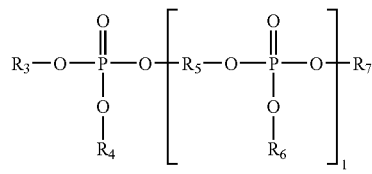

where $R_3$, $R_4$, $R_6$ and $R_7$ are a $C_{6-20}$ aryl group or an alkyl-substituted $C_{6-20}$ aryl group, respectively; $R_5$ is a $C_{6-30}$ arylene group or an alkyl-substituted $C_{6-30}$ arylene group; and l means the number of repeating unit and the average value of l in the phosphate mixture is 0 to 3; and (F) about 0.05 to 5.0 parts by weight of a fluorinated polyolefin resin with average particle size of about 0.05 to 1000 μm and density of about 1.2 to 2.3 g/cm³, per 100 parts by weight of (A)+(B)+(C).

2. The flame retardant thermoplastic resin composition as defined in claim 1, wherein said cyclic phosphazene has a linear structure or a structure with a branched chain at the main chain.

3. The flame retardant thermoplastic resin composition as defined in claim 1, wherein $R_1$ is phenoxy and $R_2$ is a derivative from catechol, resorcinol, hydroquinone, or the bisphenylenediol represented by the following formula:

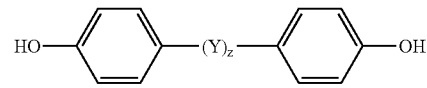

where Y is alkylene of $C_{1-5}$, alkylidene of $C_{1-5}$, cycloalkylidene of $C_{5-6}$, S or $SO_2$, and z is 0 or 1.

4. The flame retardant thermoplastic resin composition as defined in claim 1, wherein said $R_3$, $R_4$, $R_6$ and $R_7$ are a phenyl group or an alkyl-substituted phenyl group where the alkyl is selected from the group consisting of methyl, ethyl, isopropyl and t-butyl, and $R_5$ is a derivative from resorcinol, hydroquinone, or bisphenol-A.

5. A molded article produced from the flame retardant thermoplastic resin composition as defined in claim 1.

6. The flame retardant thermoplastic resin composition as defined in claim 1, wherein said $R_3$, $R_4$, $R_6$ and $R_7$ are a phenyl group or an alkyl-substituted phenyl group where the alkyl is methyl, ethyl, isopropyl or t-butyl.

7. The flame retardant thermoplastic resin composition as defined in claim 6, wherein said $R_3$, $R_4$, $R_6$ and $R_7$ are an alkyl-substituted phenyl group where the alkyl is methyl, ethyl, isopropyl or t-butyl.

8. The flame retardant thermoplastic resin composition as defined in claim 1, wherein $R_5$ is a derivative from resorcinol, hydroquinone, or bisphenol-A.

9. A molded article produced from the flame retardant thermoplastic resin composition as defined in claim 2.

10. A molded article produced from the flame retardant thermoplastic resin composition as defined in claim 3.

11. A molded article produced from the flame retardant thermoplastic resin composition as defined in claim 4.

* * * * *